United States Patent [19]

Watanabe et al.

[11] 4,366,510

[45] Dec. 28, 1982

[54] VIDEO SIGNAL RECORDING AND/OR REPRODUCING DEVICE

[75] Inventors: Yuji Watanabe; Hiroyuki Hayashi, both of Tokyo, Japan

[73] Assignee: Sony Corporation, Tokyo, Japan

[21] Appl. No.: 24,450

[22] Filed: Mar. 27, 1979

[30] Foreign Application Priority Data

Apr. 8, 1978 [JP] Japan ............................ 53-41617

[51] Int. Cl.³ .................. G11B 21/10; G11B 5/02; H04N 5/78; G11B 15/48
[52] U.S. Cl. ............................ 360/10.2; 360/22; 360/27; 360/33.1; 360/74.1
[58] Field of Search ................... 360/10, 22, 27, 33, 360/74.1, 74.4, 84, 70, 101

[56] References Cited

U.S. PATENT DOCUMENTS

| 3,315,031 | 4/1967 | Kadak | 360/11 X |
| 3,639,688 | 2/1972 | Nelson | 360/101 X |
| 3,789,138 | 1/1974 | Terada | 360/10 |
| 3,968,518 | 7/1976 | Kihara et al. | 360/10 X |
| 4,035,843 | 7/1977 | Tanimura | 360/10 X |
| 4,120,007 | 10/1978 | Sato | 360/33 X |
| 4,143,405 | 3/1979 | Kubota | 360/10 |

FOREIGN PATENT DOCUMENTS

2063257 7/1971 Fed. Rep. of Germany ........ 360/84

Primary Examiner—Aristotelis M. Psitos
Attorney, Agent, or Firm—Hill, Van Santen, Steadman, Chiara & Simpson

[57] ABSTRACT

A magnetic recording and reproducing device including two video tape recording and reproducing portions each of which have tape systems including supply reels, rotatable head drum assemblies, a tape drive capstan, a take-up reel, and wherein said tapes can be driven in either the forward or reverse directions and normally are driven intermittently and alternately in the forward direction and subsequently alternately and intermittently in the reverse direction with means for providing a longitudinal control signal on said tapes in both the forward and reverse directions as well as means for recording slant video tracks alternately on the tapes during a time when a particular tape is stopped and with adjacent slant tracks on one tape being the odd fields, and the adjacent slant tracks on the other tape being even fields, and wherein between each recording in one direction is spaced a sufficient distance apart from the next recording so that intermittent recording can be placed therebetween when the direction of the tapes are reversed, and wherein the control tracks provide for synchronization of various functions of the machine.

7 Claims, 16 Drawing Figures

VIDEO SIGNAL RECORDING AND/OR REPRODUCING DEVICE

BACKGROUND OF THE INVENTION

1. Field of the Invention

This invention relates to a video tape recorder/reproducer which has instant replay. It is capable of recording standard NTSC color or monochrome video signals and then immediately replaying the recorded material either forward or in reverse, at normal speeds, twice normal speeds, one-half normal speeds, one-fifth normal speed, at continuously variable speeds ranging from stop-action to normal.

More specifically, it relates to a video signal recording and/or reproducing device in which a tape-like recording medium is intermittently transported in its longitudinal direction to form record tracks spaced by a predetermined length from each other on the recording medium.

2. Description of the Prior Art

A VTR (Video Tape Recorder) is known in which a magnetic tape is intermittently transported, and video signal of one field or one frame is recorded on, or reproduced from, the magnetic tape during the stop of the latter. In such a VTR, no guard band noise occurs on the reproduced picture in the slow reproduction mode, the still reproduction mode and reverse reproduction mode in which the transport speeds of the magnetic tape or the transport directions thereof are different. Accordingly, a reproduced picture of high quality can be obtained in the VTR.

However, a control signal (hereinafter called "CTL signal") as a reference signal for servo-control of a head of a rotary head drum or servo-control of a capstan of a tape drive system is recorded on the marginal portion of the magnetic tape which is moving. Because the CTL signal cannot be recorded on, and reproduced from, the magnetic tape unless the magnetic tape moves relative to a CTL head for recording/reproducing the CTL signal.

In some of the conventional VTRs, a portion of a magnetic tape wrapped on a rotary head drum is intermittently transported, while another portion of the magnetic tape is transported at a constant speed. However, in this case, a tape drive system is complicated in construction. Further, the relative position between the above described two portions, namely the relative position between the record track on the magnetic tape and the recorded CTL signal, is apt to vary. There is a problem that the tracking of the head cannot be accurately controlled in the reproducing mode. Further, such a VTR is known that, while the magnetic tape is moving the CTL signal is recorded on the magnetic tape to be intermittently transported. However, in this case, since the magnetic tape is intermittently driven by the capstan, the running speed of the magnetic tape rapidly increases and rapidly decreases. Accordingly, some slip sometimes occurs between the magnetic tape and the capstan. For the reason, the CTL signals cannot be sometimes accurately recorded at the regular intervals on the magnetic tape, and mistracking of the head occurs in the reproducing mode.

BRIEF SUMMARY AND OBJECTS OF THE PRESENT INVENTION

It is an object of the present invention to solve the above described problems. The present invention in one form, has two video tape recorders of the rotating head type, each of which has a tape supply and a take-up reel between which the tape is transported. The tape on leaving the supply reel is guided through a predetermined running path which includes a helical wrap around a rotatable drum which drum includes an erasing head and a record/reproduce head. It also passes over a motor driven capstan and over a control head which can record signals on and reproduce signals from a margin of the magnetic tape. Between the supply reel and the rotating drum and between the take-up reel and the capstan, means is provided to provide a varying amount of slack in the tape. The two video tapes are alternately intermittently driven. That is, the tape of a device may be continuously advanced for record/reproduce operation and the tape of the other device may be intermittently advanced forward and/or backward.

A control circuit is provided for carrying out the desired function as hereinafter explained.

In the present invention, the positional relationship between the record track and the recorded position signal is accurate, and the record track can be accurately scanned by a head.

BRIEF DESCRIPTION OF THE DRAWINGS

FIGS. 4I and 4II are partial plan views of a magnetic tape on which record tracks are formed;

DESCRIPTION OF THE PREFERRED EMBODIMENTS

Figures 1, 2:
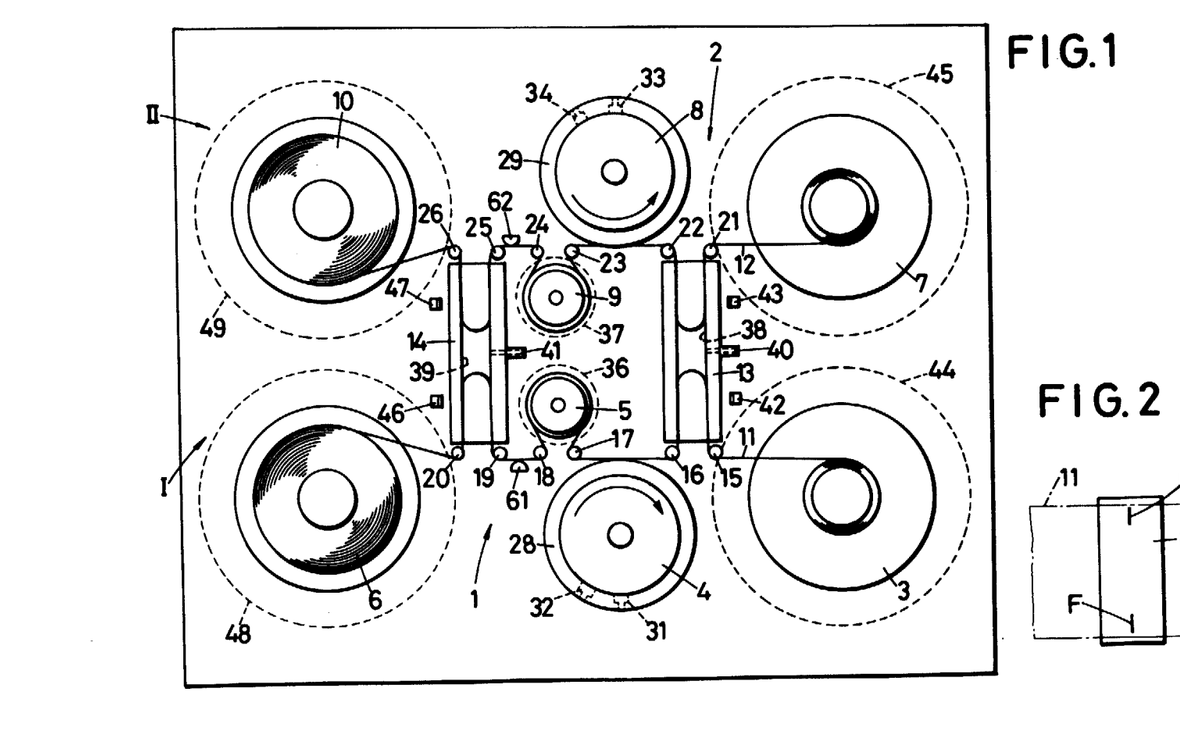
FIG. 1 is a plan view of a VTR according to one preferred embodiment of this invention.
FIG. 2 is a front diagrammatic view of a CTL head in FIG. 1.

FIG. 1 is a diagrammatic plan view of a VTR according to one embodiment of this invention. This VTR consists of two VTR parts (I) and (II). The one VTR part includes a first tape running system 1. The other VTR part includes a second tape running system 2. The first tape running system 1 is constituted by a supply (take-up) reel 3, a head drum assembly 4, a tape drive wheel 5 and a take-up (supply) reel 6. Similarly, the second tape running system 2 is constituted by a supply (take-up) reel 7, a head drum assembly 8, a tape drive wheel 9 and a take-up (supply) reel 10. A pair of accumulators 13 and 14 are arranged between the first tape running system 1 and the second tape running system 2. Some portions of magnetic tapes 11 and 12 threaded through the respective tape running systems 1 and 2 are temporarily stored in the accumulators or vacuum columns 13 and 14 by vacuum action of the latter.

The four reels 3, 6, 7 and 10 are of the open-reel type. The magnetic tape 11 and 12 are wound on hubs of the reels 3, 6, 7 and 10, respectively. In the first tape running system 1, the magnetic tape 11 fed from the supply reel 3 is guided through a predetermined tape running path by guide pins 15, 16, 17, 18, 19 and 20. Similarly, in the second tape running system 2, the magnetic tape 12 is guided through another predetermined tape running path by guide pins 21, 22, 23, 24, 25 and 26. The predetermined tape running paths of the first and second tape running systems 1 and 2 are symmetrical to each other in the VTR according to this embodiment.

In the first tape running system 1, a CTL head 61 is arranged between the guide pins 18 and 19 so as to contact with the magnetic tape 11. Similarly, in the second tape running system 2, another CTL head 62 is arranged between the guide pins 24 and 25 so as to contact with the magnetic tape 12. The CTL heads 61 and 62 are the ones which can record signals on, and reproduce signals from, the magnetic tapes 11 and 12.

FIG. 2 is a schematic front view of the CTL head 61 which has the same structure as the other CTL head 62. As shown in FIG. 2, the CTL head 61 includes an upper magnetic head B and a lower magnetic head F which are opposite to the upper and lower marginal portions of the magnetic tape 11 shown by the chain line in FIG. 2. The magnetic heads B and F are located substantially at the same position with respect to the longitudinal direction (running direction) of the magnetic tape 11. In the CTL head 61, the magnetic heads B and F may be so laterally arranged in the longitudinal direction of the magnetic tape 11 that the distance between the magnetic heads B and F corresponds to a multiple of two pitches of tracks to be hereinafter described in detail.

The rotary head drum assembly 4 includes a head drum 28 which is rotated in the clockwise direction. The other rotary head drum assembly 8 includes a head drum 29 which is rotated in the counter-clockwise direction. The relationship between the scanning directions of the head drums 28 and 29 and the running directions of the magnetic tapes 11 and 12 are the same as each other in the VTR parts I and II. A magnetic recording/reproducing head 31 is attached to a part of the peripheral portion of the head drum 28. A magnetic erasing head 32 is attached to the peripheral portion of the head drum 28 adjacent to the head 31. The magnetic erasing head 32 runs along substantially the same scanning path as the magnetic head 31. Similarly, a magnetic recording/reproducing head 33 and a magnetic erasing head 34 are attached to a part of the peripheral portion of the head drum 29, adjacent to each other. The magnetic recording/reproducing heads 31 and 33 follow the magnetic erasing heads 32 and 34 with respect to the rotational direction of the head drums 28 and 29, respectively. While the previously recorded signals are erased from the magnetic tape 10 or 11 by the magnetic erasing head 32 or 34, new signals are recorded on the magnetic tape 10 or 11 by the magnetic head 31 or 33. The tape drive wheel 5 for intermittently feeding the magnetic tape 11 is arranged near the head drum assembly 4, and it is in the form of cylindrical roller having a smaller diameter than the rotary head drum 28. Rubber is attached to the circumferential surface of the drive wheel 5 to impart a considerable frictional force to the magnetic tape 11. The tape drive wheel 5 is intermittently driven by a capstan motor 36 directly connected to the drive wheel 5.

The tape drive wheel 9 in the second tape running system 2 has the same structure as the tape drive wheel 5 in the first tape running system 1. Similarly, it is intermittently driven by a capstan motor 37 directly connected to itself. The capstan motors 36 and 37 are, for example, DC motors. Code generators for detecting rotational angles of the motors 36 and 37 are fixed to rotary shafts of the capstan motors 36 and 37. The rotations of the motors 36 and 37 are controlled by the detected outputs of the code generators. The capstan motors 36 and 37 may be pulse motors or step motors.

Next, there will be described the accumulators 13 and 14 arranged between the first tape running system 1 and the second tape running system 2.

Through holes 38 and 39 are made in the accumulators 13 and 14 along the lengthwise directions of the accumulators 13 and 14, respectively. The through holes 38 and 39 have rectangular cross-section the width of which is nearly equal to the width of the magnetic tapes 11 and 12. Air in the through holes 38 and 39 is sucked through pipes 40 and 41 by not-shown vacuum pumps, so that the slackened magnetic tapes 11 and 12 are guided into the through holes 38 and 39 in the form of letter U.

A pair of sensing elements 42 and 43 for detecting the magnetic tapes 11 and 12 are arranged at the side of the accumulator 13. A reel motor 44 to drive the reel 3 is rotated with the detecting output of the sensing element 42. And a reel motor 45 to drive the reel 7 is rotated with the detecting output of the sensing element 43. Similarly, another pair of sensing elements 46 and 47 for detecting the magnetic tapes 11 and 12 are arranged at the side of the other accumulator 14. A reel motor 48 to drive the reel 6 is rotated with the detecting output of the sensing element 46. And a reel motor 49 to drive the reel 10 is rotated with the detecting output of the sensing element 47. Accordingly, portions of the magnetic tapes 11 and 12 of substantially predetermined length are always stored in the accumulators 13 and 14.

The magnetic tapes 11 and 12 are wrapped spirally and entirely around the head drums 28 and 29 in the form of letter α.

Accordingly, record tracks are formed on the magnetic tapes 11 and 12 at a predetermined angle to the longitudinal direction of the magnetic tapes 11 and 12. In the recording operation and the reproducing operation, the magnetic heads scans the stopping magnetic tapes 11 and 12. Accordingly, the angles of the scanning paths of the magnetic heads in the recording operation and the reproducing operation are equal to each other. No noise band occurs on the reproduced picture in any of the still reproduction, the slow-motion reproduction and the reverse-motion reproduction.

Next, operations of the VTR according to this embodiment will be described with reference to FIGS. 3 to 7.

Figure 3:
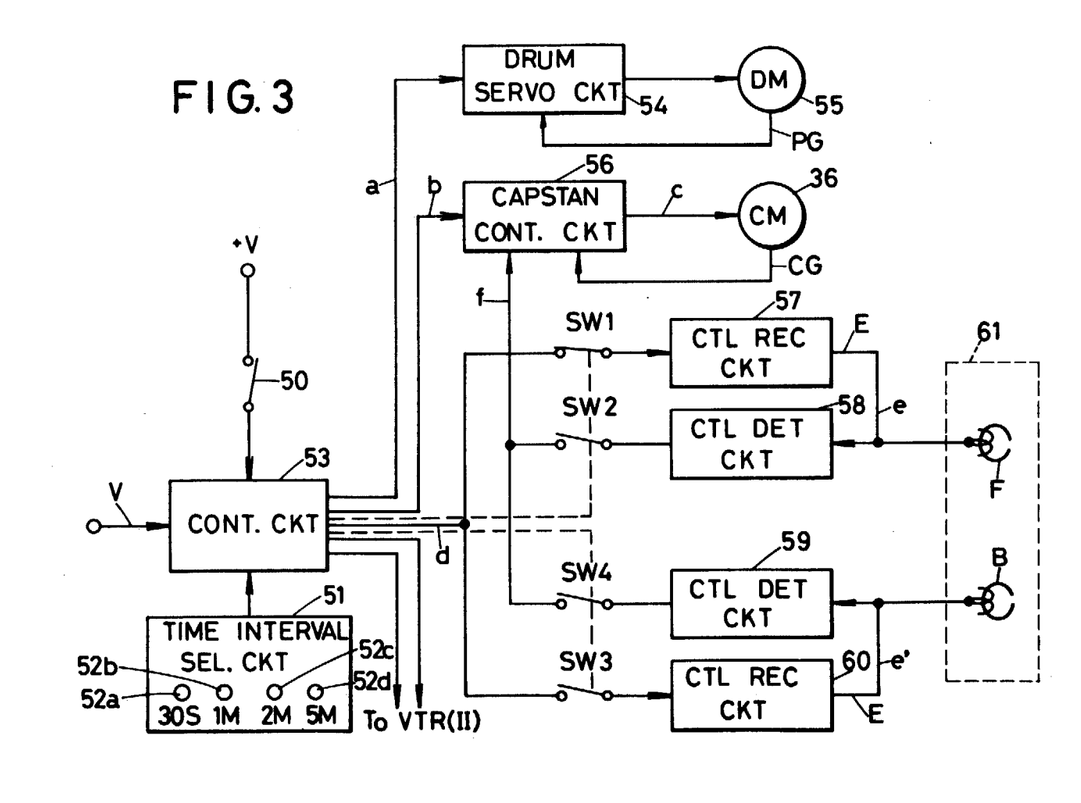
FIG. 3 is a block diagram of a drive control circuit for the VTR of FIG. 1.

FIG. 3 is a block diagram of a drive control circuit for the VTR part I shown in FIG. 1. Another drive control circuit for the VTR part II shown in FIG. 1 is equal to that of the VTR part I in construction. And the former operates in the similar manner to the latter except that the former's operation is different in timing from the latter's operation.

FIG. 4I and FIG. 4II are plan views of respective parts of the magnetic tapes 11 and 12 on which record tracks are formed, respectively.

FIGS. 5A to 5F are wave forms of signals at the respective parts of the block diagram of FIG. 3.

FIGS. 6A and 6B are views for explaining the relationship between the record track and CTL track formed on the magnetic tape, and showing the reproduced CTL signal.

Figure 7:
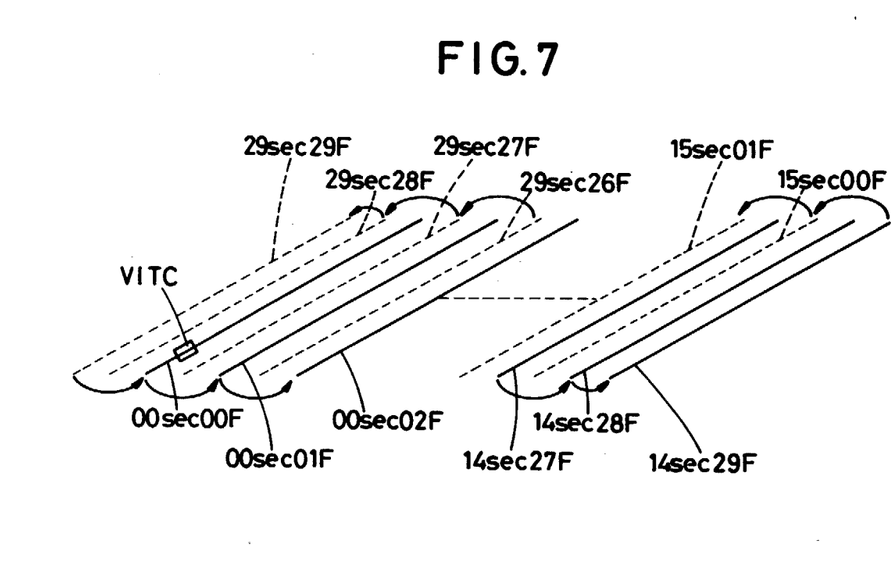
FIG. 7 is a view for explaining the recording order of the record tracks.

FIG. 7 is a view for explaining the scanning order of the record tracks.

In the recording operation and reproducing operation of the VTR according to this embodiment, the magnetic tapes 11 and 12 are transported forward and backward in a selected, predetermined time interval. In the VTR part I, when the magnetic tape 11 is transported in the FW (forward) direction shown by the arrow in FIG. 4I, record tracks $f_1, f_4 \ldots f_n$ shown by the solid lines are successively formed on the magnetic tape 11. And when the magnetic tape 11 is transported in the BW (backward) direction shown by the arrow in FIG. 4I, record tracks $f_{n+2} \ldots$ shown by the dotted lines are successively formed between the adjacent record tracks shown by the solid lines on the magnetic tape 11. Also in the VTR part II, record tracks are formed on the magnetic tape 12 in the similar manner. The VTR parts I and II alternately operate every one field of video signals. Video signals of odd fields are recorded on the magnetic tape 11 in the VTR part I, while video signals of even fields are recorded on the magnetic tape 12 in the VTR parts II.

In FIG. 3, one of selecting buttons 52a, 52b, 52c and 52d in a time interval selection circuit 51 is selectively pushed to set the time interval of the recording operation. For example, time intervals of 30 seconds, 60 seconds, 2 minutes and 5 minutes can be set by the selecting buttons 52a, 52b, 52c and 52d, respectively. When the selecting button 52a is pushed, the magnetic tapes 11 and 12 are transported forward and backward in the time interval of 30 seconds. In other words, the magnetic tapes 11 and 12 are transported one way, namely, forward or backward in 15 seconds. New video signals are successively recorded on the magnetic tapes 11 and 12 in the time interval of 30 seconds.

In the VTR according to this embodiment, CTL signals are recorded on the magnetic tapes 11 and 12 (such recording operation is hereinafter called "code recording mode", before video signals start to be recorded on the magnetic tapes 11 and 12. When a code recording mode switch 50 is closed in FIG. 3, a high level signal is supplied through the switch 50 to a control circuit 53 to put the VTR into the code recording mode. A signal a having the vertical frequency of 60 Hz is supplied from the control circuit 53 to a drum servo circuit 54. A drum motor 55 is rotated at the speed of 60 Hz, with the output of the drum servo circuit 54. Accordingly, the head drum 28 for the VTR part I shown in FIG. 1 is driven at the vertical frequency. The head drum 29 for the VTR part II is rotated in the same manner.

Figure 5:
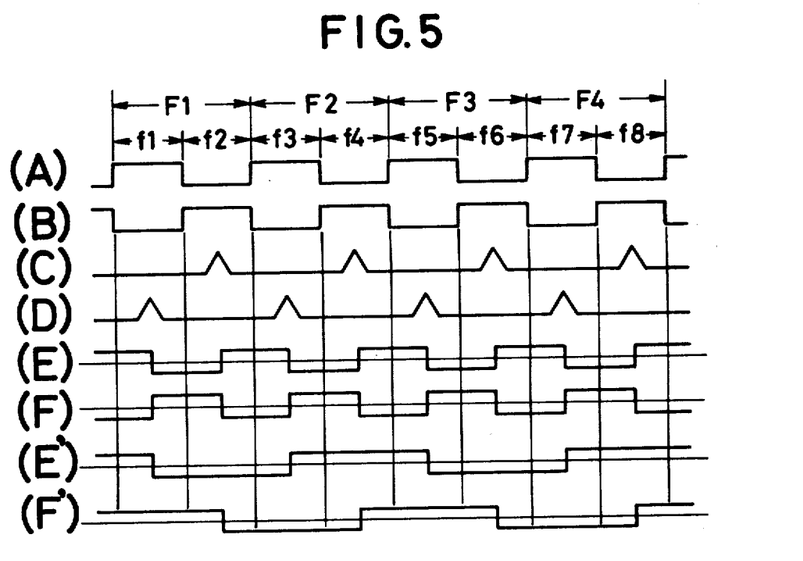
FIG. 5, consisting of A-F, is a set of waveforms of signals at the respective parts in FIG. 3.
Figure 6:
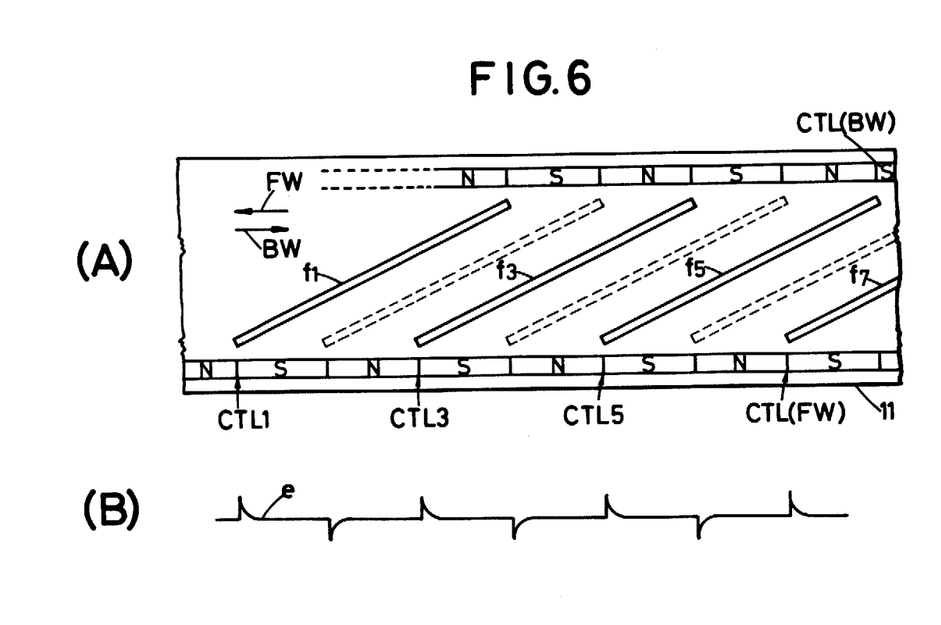
FIG. 6A and FIG. 6B are views for explaining the relationship between the record track and CTL track on the magnetic tape, and showing reproduced CTL signals.

Position detectors PG (not shown) are fixed on the rotary shafts of the head drums 28 and 29 to detect the rotational positions of the latter. Change-over signals shown in FIG. 5A and FIG. 5B are formed on the basis of the outputs of the position detector PG. In the recording operation and reproducing operation, the change-over signals A and B are used as timing signals for changing over the magnetic head 31 of the VTR part I and the magnetic head 33 of the VTR part II. In the odd field (A-field), the change-over signal A becomes high level to record or reproduce the video signals by the magnetic head 31 of the VTR part I. And in the even field (B-field), the change-over signal B becomes a high level to record or reproduce the video signals by the magnetic head 33 of the VTR part II.

In the code recording mode, a capstan control signal b is supplied from the control circuit 53 to a capstan control circuit 56. The capstan motor 36 of the VTR page I is intermittently driven with drive current supplied from the capstan control circuit 56. As above described, the code generator (not shown) is fixed on the rotary shaft of the capstan motor 36. The detecting output CG of the code generator is fed back to the capstan control circuit 56, so that the capstan motor 36 is so controlled as to rotate by a predetermined angle in one of the intermittent rotations. Also, the capstan motor 37 of the VTR part II is intermittently driven by a corresponding capstan control circuit in the same manner as the capstan motor 36 of the VTR part I.

Figure 4:
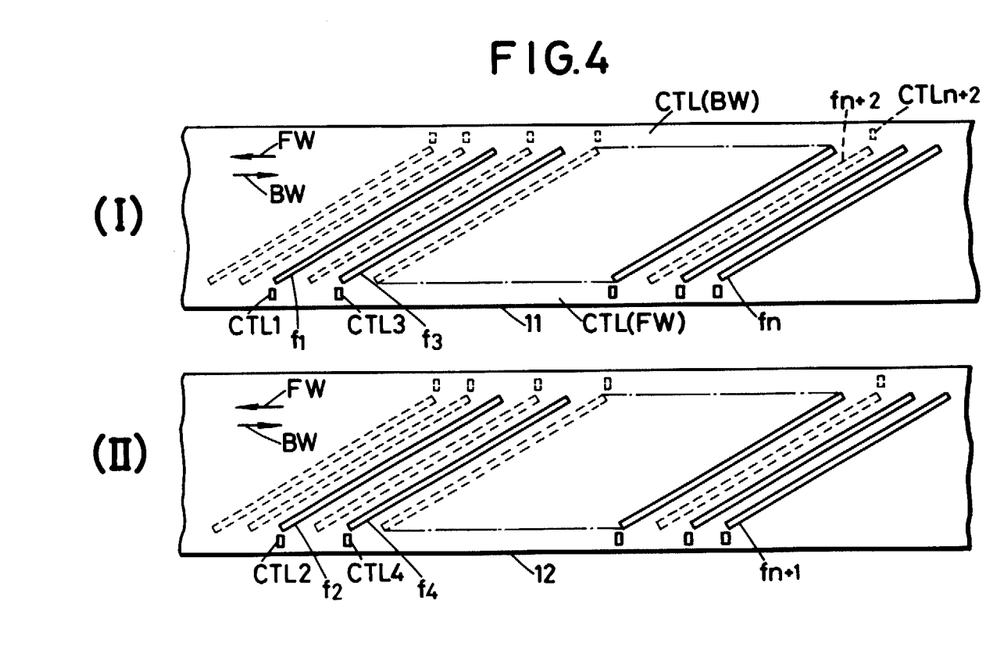

FIG. 5C and FIG. 5D show wave forms of the drive current supplied to the capstan motors 36 and 37. The wave forms are substantially triangular as shown in FIG. 5C and FIG. 5D, so as to prevent steep acceleration and deceleration of the capstan motors 36 and 37 as much as possible. The one drive current is supplied to the capstan motor 36 of the VTR part I in the even field, as shown in FIG. 5C, while the other drive current is supplied to the capstan motor 37 of the VTR part II in the odd field. Thus, in the first field, the magnetic tape 11 in the VTR part I stops, while the head drum 28 rotates one revolution to form the track $f_1$ on the magnetic tape 11 as shown in FIG. 4-I. On the other hand, in the first field, the tape drive wheel 9 of the VTR part II is rotated by the predetermined angle by the capstan motor 37 to transport the magnetic tape 12 by two pitches of record tracks in the FW-direction.

Next, in the second field, the tape drive wheel 5 of the VTR part I is rotated by the predetermined angle by the capstan motor 36 to transport the magnetic tape 11 by two pitches of record tracks in the FW-direction. On the other hand, in the second field, the head drum 29 of the VTR part II rotates one revolution to form a track $f_2$ on the magnetic tape 12 as shown in FIG. 4II. After that, in the same manner, the tracks $f_3, f_5, \ldots$ of the odd fields and the tracks $f_4, f_6 \ldots$ of the even fields are formed at two pitches of record tracks alternately on the magnetic tapes 11 and 12.

While the magnetic tape 11 is intermittently transported in the FW direction, a switch $SW_1$ is closed with the control of the control circuit 53 in FIG. 3. Accordingly, a record CTL signal d is supplied to a CTL recording circuit 57. A recording current E shown in FIG. 5E is formed on the basis of the record CTL signal d, and it is supplied from the CTL recording circuit 57 to the lower magnetic head F of the CTL head 61 shown in FIG. 2. In the odd field, namely when the magnetic tape 11 is stopping, the direction of the recording current E is inverted from positive to negative. And in the even field, namely when the magnetic tape 11 is being transported, the direction of the recording current E is inverted from negative to positive. As a result, a CTL track CTL(FW) is formed on the lower marginal portion of the magnetic tape 11 in the manner shown in FIG. 6A. The magnetization in the CTL track CTL(FW) is inverted from N-polarity to S-polarity at a position corresponding to the track $f_1$. When the magnetic tape 11 is being transported by the distance between the tracks $f_1$ and $f_3$, the magnetization in the CTL track CTL(FW) is inverted from S-polarity to N-polarity. And the magnetization in the CTL track CTL(FW) is again inverted from N-polarity to S-polarity at a position corresponding to the track $f_3$ in the condition that the magnetic tape 11 stops.

As schematically shown in FIG. 6A, signals $CTL_1$, $CTL_3 \ldots$ corresponding to the inversion positions from N-polarity to S-polarity are recorded at positions corresponding to the tracks $f_1, f_3 \ldots$ by the magnetic head F.

While the magnetic tape 11 stops, the signals $CTL_1$, $CTL_3$ ... are recorded on the magnetic tape 11. Accordingly, some slip between the tape drive wheel 5 and the magnetic tape 11 which is caused by the intermittent drive, has no influence on the positional relationship between the tracks $f_1$, $f_3$ ... and the signals $CTL_1$, $CTL_3$.... The magnetization may be inverted any time during the time of one field when the magnetic tape 11 stops. Accordingly, even when the inversion time of the CTL signal d or recording current E varies more or less, the positional relationship between the tracks $f_1$, $f_3$ ... and the signals $CTL_1$, $CTL_3$, ... is maintained constant. Further, the widths of the negative and positive pulses of the recording current E do not need to be equal to each other. Similarly, another recording current F shown in FIG. 5F is supplied to the lower magnetic head F of the CTL head 62 in the VTR part II. The recording currents E and F are opposite to each other in phase. The magnetization is inverted from N-polarity to S-polarity during the time of the even field when the magnetic tape 12 stops. Signals $CTL_2$, $CTL_4$ ... are recorded on the magnetic tape 12, corresponding to the tracks $f_2$, $f_4$ ....

Alternatively, in the manner shown in FIGS. 5E' and 5F', the directions of the recording currents to be supplied to the CTL heads may be inverted only in the time when the magnetic tapes 11 and 12 stop, respectively. In that case, both the positive differentiation pulses of the reproduced CTL signals and the negative differentiation pulses thereof, as shown in FIG. 6B, are used as a reference signal for transporting the magnetic tape. The recording current E and F shown in FIG. 5E and FIG. 5F change from positive to negative, and from negative to positive. However, they may change from positive to zero and from zero to positive. Or they may change from negative to zero, and from zero to negative. In that case, there is the possibility that the CTL heads 61 and 62 are magnetized. Accordingly, when the recording currents E and F change from positive to zero and from zero to positive in the first code recording mode, it is preferable that the recording currents E and F change from negative to zero and from zero to negative in the next code recording mode. As already described, the duty cycle of the CTL recording current (ratio of the width of the positive pulse to that of the negative pulse) does not always need to be 50%. When it is not 50%, it is preferable that the levels of the positive and negative pulses of the recording currents E and F are so different from each other that the CTL heads 61 and 62 are not magnetized. Further, such a recording current may be used that the negative portion of the recording current E shown in FIG. 5E is reduced to zero, and the positive portion thereof is changed to a pulse-modulated wave of a predetermined frequency. In that case, the envelope of the reproduced CTL signal is detected for controlling the transport of the magnetic tape. Or such a recording current may be used that the positive portion of the recording current E is a pulse-modulated wave of a predetermined frequency and the negative portion thereof is another pulse-modulated wave opposite in phase to the first-mentioned pulse-modulated wave. In that case, a control signal for transporting the magnetic tape is obtained by synchronous detection of the reproduced CTL signal.

In the code recording mode, after the CTL signals end to be recorded in the forward direction in half of the selected time interval, CTL (BW) signals start to be recorded in the backward direction with control of the control circuit 53. In the last forward tape transport, the magnetic tape 11 is transported forward by one pitch of tracks, as shown in FIG. 4I, with the capstan control signal b from the control circuit 53. And in the next odd field, the magnetic tape 11 is transported backward by two pitches of tracks to form a track $f_{n+2}$ on the magnetic tape 11 as shown in FIG. 4I. Thus, backward-successive tracks are formed between the adjacent two of the forward-successive tracks $f_1$, $f_3$ ... on the magnetic tape 11. The turning manner of the magnetic tape 12 in the VTR part II is similar to that of the magnetic tape 11 in the VTR part I.

The intermittent transport of the magnetic tape 11 in the backward direction is controlled with the CTL signal reproduced from the CTL (FW) track formed in the forward transport. In the backward transport, the switch SW 1 is opened, and switches $SW_2$ and $SW_3$ are closed, with the control of the control circuit 53. Accordingly, CTL (BW) signals are recorded on the upper marginal portion of the magnetic tape 11 by the magnetic head B of the CTL head 61 to form a CTL (BW) track, while the CTL (FW) signals are reproduced from the CTL (FW) track formed on the lower marginal portion by the magnetic head F of the CTL head 61. With the intermittent backward transport of the magnetic tape 11, the CTL signals shown in FIG. 6B is reproduced by the magnetic head F of the CTL head 61. Positive differentiation pulses are generated at positions $CTL_1$, $CTL_3$ ... where the magnetization is inverted from S-polarity to N-polarity. Negative differentiation pulses are generated at other positions where the magnetization is inverted from N-polarity to S-polarity. However, the magnetic tape 11 stops at the other positions where the magnetic head F contacts. Accordingly, the negative differentiation pulses are not rightly generated. However, since the negative differentiation pulses are not used as the CTL signals, the control of the capstan motor 36 is not affected thereby. In FIG. 3, the reproduced CTL signal e from the magnetic head F of the CTL head 61 is supplied to a CTL detecting circuit 58. The positive differentiation pulses shown in FIG. 6B are selected at the CTL detecting circuit 58, and is supplied as a CTL signal f through the switch SW 2 to the capstan control circuit 56. The drive current c supplied from the capstan control circuit 56 is controlled on the basis of the CTL signal f, the capstan control signal b and the output CG of the code generator respectively, supplied to the capstan control circuit 56 to control the rotational angle of the capstan motor 36 in the reverse direction, and hence to control the stop position of the magnetic tape 11. Thus, the backward-successive tracks $f_{n+2}$, ... are rightly forward midway between the adjacent two of the forward-successive tracks $f_1$, $f_3$ ..., respectively. In that case, since the stop position of the magnetic tape 11 is controlled on the basis of the CTL signal f, the positional relationship between the record positions $CTL_1$, $CTL_3$ ... in the forward CTL track and the backward-successive record tracks $f_{n+2}$, ... are very accurate.

On the other hand, the record CTL signal d from the control circuit 53 is supplied through the switch SW 3 to a CTO recording circuit 60 in the similar manner to the forward CTL recording operation. A recording current E, the polarity of which is inverted at the period of one field as shown in FIG. 5E, is supplied from the CTL recording circuit 60 to the magnetic head B of the CTL head 61. As the result, the backward CTL (BW) track is formed on the upper marginal portion of the magnetic tape 11. Accordingly, CTL record spots CTL$_{n+2}$, ..., as shown by the dotted lines in FIG. 4I, are formed in correspondence with the backward-successive tracks f$_{n+2}$, .... The CTL record spots CTL$_1$, CTL$_3$, ... on the forward CTL track positionally correspond to the tracks f$_1$, f$_3$ .... Further, the positional relationship between the CTL record spots CTL$_1$, CTL$_3$..., the backward-successive tracks f$_{n+2}$..., and the CTL record spots CTL$_{n+2}$, ... on the backward CTL track, are accurately regulated. Accordingly, also the positional relationship between the CTL record spots CTL$_{n+2}$, ... on the backward CTL track and the forward-successive tracks f$_1$, f$_3$ ... is accurate.

In the code recording mode, color bar signals may be supplied to the magnetic heads 31 and 33 of the head drums 31 and 33. In that case, drop-outs due to any damage of the coated surface of the tape in the set forward-backward record sections of the magnetic tapes 11 and 12 can be detected by reproducing the color bar signals from the magnetic tapes 11 and 12.

After the code recording mode is finished, video signals are recorded on the magnetic tapes 11 and 12. The VTR is put into the video recording mode with actuation of a not-shown record button. New video signals are recorded on the magnetic tapes 11 and 12 at the set repeat period of 30 seconds. The VTR may be so designed as to be automatically put into the video recording mode after the end of the code recording mode. In the video recording mode, the switches SW 1 and SW 3 are opened with control of the control circuit 53. Further, in the forward transport of the magnetic tape 11, the switch SW 4 is closed, and in the backward transport of the magnetic tape 11, the switch SW 2 is closed, with control of the control circuit 53.

When the magnetic tape 11 is intermittently driven in the forward direction, the CTL signal e' is reproduced from the backward CTL (BW) track by the magnetic head B of the CTL head 61, and is supplied to the CTL detection circuit 59. The CTL signal f from the CTL detection circuit 59 is supplied through the switch SW 4 to the capstan control circuit 56. Accordingly, in the forward recording operation, the stop position of the magnetic tape 11 is controlled with the CTL signal obtained from the backward CTL (BW) track, and the video signals are recorded on the tracks f$_1$, f$_3$..., while the magnetic head 31 scans the tracks f$_1$, f$_3$, ....

When the magnetic tape 11 is intermittently driven in the backward direction, the CTL signal e is reproduced from the forward CTL (FW) track by the magnetic head F of the CTL head 61, and is supplied to the CTL detection circuit 58. The CTL signal f from the CTL detection circuit 58 is supplied through the switch SW 2 to the capstan control circuit 56. Accordingly, in the backward recording operation, the stop position of the magnetic tape 11 is controlled with the CTL signal obtained from the forward CTL (FW) track, and the video signals are recorded on the tracks f$_{n+2}$, ..., while the magnetic head 31 scans the tracks f$_{n+2}$, ....

As shown in FIG. 7, first in the forward recording operation, video signal of a frame number 00 sec 00 F (Frame) which corresponds to the first field in the VTR part I and to the second field in the VTR part II, is recorded on the first track of the magnetic tape 11, and then a video signal of a frame number 00 sec 01 F is recorded on the second track of the magnetic tape 11 which is distant by two pitches of tracks from the first track. Hereafter, video signals of 00 sec 02 F, ... are recorded on the successive tracks of the magnetic tape 11 which are distant by two pitches from each other. A video signal of 14 sec 29 F is recorded on the last track of the magnetic tape 11. The last track is distant by one pitch of tracks from the previous track on which a video signal of a frame number 14 sec 28 F is recorded. Next, the magnetic tape 11 is intermittently transported by two pitches of tracks in the backward direction to record video signals of frame numbers 15 sec 00 F, 15 sec 01 F, ... in order. And a video signal of a frame number 29 sec 29 F is recorded on the last of the backward-successive tracks distant by one pitch of tracks from the previous track on which a video signal of a frame number 29 sec 28 F is recorded.

Then, the magnetic tape 11 is intermittently transported again in the forward direction. While the previously recorded signals are erased in order by the erasing heads 32 and 34 of the head drums 28 and 29, video signals of frame numbers 30 sec 00 F, 30 sec 01 F, ... are recorded on the tracks in order. And the recording operation of the video signals stops at the time when a not-shown stop button is actuated. The video-signals recorded in the interval extending from a time of 30 seconds (selected time interval) before previous to the record stop time to the latter can be reproduced from the magnetic tapes 11 and 12.

VITC (Vertical Interval Time Code) signals, which are obtained by digital coding of the frame numbers 00 sec 00 F, ..., may be interposed in the vertical blanking intervals of the tracks to be recorded thereon, as shown in FIG. 7. In that case, for example, edition of the magnetic tape and automatic reproduction operation can be easily effected.

In the above embodiment, the VTR of the 1 head type has been described. However, this invention may be applied to a VTR of the 1.5 head type or the 2 head type, or a VTR having more than two heads. Further, in the above embodiment, the two magnetic tapes 11 and 12 are used for recording and reproducing the video signals in the VTR consisting of the VTR part I and VTR part II. However, a VTR according to this invention may be so designed as to use one magnetic tape commonly for the VTR part I and VTR part II.

Further, in the above embodiment, the positions of the CTL record spots on the backward CTL (BW) track are controlled with reference to the CTL signals recorded on the forward CTL (FW) track. However, not only in the forward transport but also in the backward transport, the rotational angle of the capstan motor 36 may be controlled only with the output of the code generator fixed thereon, to intermittently transport the magnetic tape 11 for forming the backward CTL (BW) track thereon.

According to one form of the present invention, the recording current the condition of which changes at least during the stop of the tape-like recording medium to be intermittently transported, is supplied to the recording means to record the position signals corresponding to the positions of the record track on the recording medium. Thus, since the position signals are recorded, during the stop of the recording medium on the recording medium on which the record tracks are to be formed, the positional relationship between the record track and the recorded position signal is very accurate.

According to a second form of the present invention, the recording current, the condition of which changes at least during the stop of the tape-like recording medium to be intermittently transported forward, is supplied to the first position-signal recording/reproducing means to record the first position-signals corresponding to the forwardly-successive record tracks on the recording medium, and while the stop position of the recording medium to be intermittently transported backward is controlled with the reproduced position signal which is obtained from the first position-signal recording means during the movement of the recording medium, the recording current, the condition of which changes at least during the stop of the recording medium, is supplied to the second position-signal recording/reproducing means to record the second position signals corresponding to the backwardly-successive record tracks. Accordingly, the similar effect to that of the first form of the invention can be obtained by the second form of the invention. Further, the positional relationship among the first and second position signals, the forwardly successive record tracks and the backwardly successively record tracks can be very accurate.

According to a third form of the invention, the recording current, the condition of which changes at least during the stop of the tape-like recording medium to be intermittently transported forward, is supplied to the first and second position-signals recording/reproducing means to record the first and second position signals corresponding to the forwardly-successive record tracks and the backwardly-successive record tracks on the recording medium, and when the video signals are recorded or reproduced, the stop position of the recording medium to be intermittently transported forward is controlled with the second reproduced position signals produced during the movement of the recording medium, and the stop position of the recording medium to be intermittently transported backward is controlled with the first reproduced position signals produced during the movement of the recording medium. Accordingly, the similar effect to that of the first form of the invention can be obtained by the second form of the invention. When the positional relationship between the record positions of the first and second position signals is accurate, the forwardly and backwardly successive record tracks can be accurately scanned to record or reproduce the video signals.

It will be apparent to those skilled in the art that many modifications and variations may be effected without departing from the spirit and scope of the novel concepts of the present invention.

We claim as our invention:

1. A magnetic recording and reproducing device comprising two video tape recording and reproducing parts, each having a tape running system including a supply reel, a rotatable head drum assembly, a take-up reel, a capstan for moving said tape in either longitudinal direction of said tape, a control head in the tape path of each of said tapes over which at least one marginal edge of each of said tapes rides, each of said control heads having upper and lower recording/reproducing portions which are mounted opposite to the upper and lower portions of their respective associated tapes, means for transporting said tapes backward and forward in a selected time interval, means for recording control signals on each of said tapes during a recording control signal mode, means for recording in slant tracks video signals on each of said tapes during a video signal mode, said two tape recording and reproducing parts alternately operating so that one records and reproduces odd fields and the other records and reproduces even fields of the video signal, and said means for transporting said tapes alternately holding one tape stationary while the other tape is driven and during said selected time interval alternately driving said two video tapes in the forward direction for one half of said selected time interval and then alternately driving said two tapes in the backward direction for the remaining half of said selected time inverval, and switching means for switching between said recording control signal mode and said video signal mode.

2. A magnetic recording and reproducing device according to claim 1, wherein said recorded control signal has at least two conditions and the initiation of the recorded slant range video signals correspond to the position of the change in condition of said control signal.

3. A magnetic recording and reproducing device according to claim 2, including detecting means to detect said recorded control signals, and drive means for said supply reel and said take-up reel and said detecting means connected to said drive means.

4. A magnetic recording and reproducing device according to claim 2, including detecting means to detect said recorded control signals and said means for recording in slant tracks video signals receiving the outputs of said detecting means such that the start of recording of said slant tracks coincides with said recorded control signals.

5. A magnetic recording and reproducing device according to claim 1 including control signal supplying means connectable, respectively, to said upper and lower recording/reproducing portions of said control head of each of said two video tape recording parts for recording control signals on said tapes.

6. A magnetic recording and reproducing device according to claim 5 including circuit means for respectively connecting said upper and lower recording/reproducing portions of said control head for each of said video tape recording parts respectively to said means for transporting said tapes backward and forward.

7. A magnetic recording and reproducing device comprising two video tape recording and reproducing parts, each having a tape running system including a supply reel, a rotatable head drum assembly, a take-up reel, a capstan for moving said tape in either longitudinal direction of said tape, a control head in the tape path of each of said tapes over which at least one marginal edge of each of said tapes rides, each of said control heads having upper and lower recording/reproducing portions which are mounted opposite to the upper and lower portions of their respective associated tapes, a pair of accumulators between said first tape running system and said second tape running system, said accumulators being constructed to temporarily store and handle varying amounts of tape resulting from the intermittent advance of said tapes, means for transporting said tapes backward and forward in a selected time interval, means for recording control signals on each of said tapes during a recording control signal mode, means for recording in slant tracks video signals on each of said tapes during a video signal mode, said two video tape recording and reproducing parts alternately operating so that one records and reproduces odd fields and the other records and reproduces even fields of the video signal, and said means for transporting said tapes alternately holding one tape stationary while the other tape is driven and during said selected time interval alternately driving said two video tapes in the forward direction for one half of said selected time interval and then alternately driving said two tapes in the backward direction for the remaining half of said selected time interval, and switching means for switching between said recording control signal mode and said video signal mode.

* * * * *